United States Patent
Mao et al.

(10) Patent No.: US 11,863,353 B2
(45) Date of Patent: Jan. 2, 2024

(54) ANCHOR PROCESS OF DATA SYMBOLS IN CHANNEL ESTIMATION

(71) Applicant: NOKIA SOLUTIONS AND NETWORKS OY, Espoo (FI)

(72) Inventors: Weiqiang Mao, Zhejiang (CN); Tao Yu, Zhejiang (CN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/885,075

(22) Filed: Aug. 10, 2022

(65) Prior Publication Data
US 2022/0393911 A1  Dec. 8, 2022

Related U.S. Application Data (63) Continuation of application No. 17/295,270, filed as application No. PCT/CN2018/116576 on Nov. 21, 2018, now abandoned.

(51) Int. Cl.
*H04L 1/02* (2006.01)
*H04L 25/02* (2006.01)
(Continued)

(52) U.S. Cl.
CPC ......... *H04L 25/0204* (2013.01); *H04B 7/046* (2013.01); *H04L 27/0012* (2013.01)

(58) Field of Classification Search
CPC .............. H04L 25/024; H04L 25/0236; H04L 27/2695; H04L 25/0216; H04B 7/0413;
(Continued)

(56) References Cited

U.S. PATENT DOCUMENTS

2002/0150037 A1* 10/2002 Bao .................... H04L 27/2647
370/480
2008/0214115 A1  9/2008 Hwang et al.
(Continued)

FOREIGN PATENT DOCUMENTS

CN   101383652 A   3/2009
CN   102783111 A   11/2012
(Continued)

OTHER PUBLICATIONS

Extended European Search Report corresponding to U.S. Appl. No. 17/295,270, dated Jun. 22, 2022. No copy provided, per MPEP 609. Copy submitted in parent U.S. Appl. No. 17/295,270.
(Continued)

*Primary Examiner* — Khai Tran
(74) *Attorney, Agent, or Firm* — SQUIRE PATTON BOGGS (US) LLP (57) ABSTRACT

Embodiments of the present disclosure relate to a device, method, apparatus and computer readable storage medium for channel estimation in a multiple input multiple output (MIMO) system. The MIMO system comprises a receiver configured with a plurality of receiving antennas and a transmitter configured with a plurality of transmitting antennas. In example embodiments, a plurality of data symbols are detected based on channel estimation from a plurality of signals received by the plurality of receiving antenna from the plurality of transmitting antennas. The plurality of detected data symbols are adjusted based on a set of constellation points for a modulation mode used by the transmitter and associated with the plurality of signals. The channel estimation is updated based on the plurality of adjusted data symbols.

17 Claims, 4 Drawing Sheets

(51) Int. Cl.
*H04B 7/0456* (2017.01)
*H04L 27/00* (2006.01)

(58) Field of Classification Search
CPC ............... H04B 7/0691; H04B 7/0456; H04W 72/0446; H04W 72/23
USPC ........................................ 375/267, 260, 262
See application file for complete search history.

(56) References Cited

U.S. PATENT DOCUMENTS

| | | | |
|---|---|---|---|
| 2010/0177837 A1* | 7/2010 | Leonidovich | H04L 1/0631 375/267 |
| 2013/0051346 A1 | 2/2013 | Bergman et al. | |
| 2013/0107981 A1 | 5/2013 | Sampath et al. | |
| 2013/0286961 A1* | 10/2013 | Vermani | H04L 1/0003 370/329 |
| 2015/0124911 A1 | 5/2015 | Wicker, Jr. et al. | |
| 2017/0264393 A1* | 9/2017 | Park | H03M 13/27 |
| 2018/0167123 A1* | 6/2018 | Cheng | H04L 1/0054 |
| 2018/0227092 A1 | 8/2018 | Murakami et al. | |
| 2018/0287824 A1 | 10/2018 | Gresset | |
| 2019/0044588 A1* | 2/2019 | Hong | H04L 5/0048 |
| 2019/0090237 A1 | 3/2019 | Beale et al. | |
| 2019/0123792 A1* | 4/2019 | Murakami | H04L 5/0048 |
| 2022/0038206 A1* | 2/2022 | Martinez | H04L 1/1845 |
| 2022/0166650 A1* | 5/2022 | Woo | H04L 25/0204 |

FOREIGN PATENT DOCUMENTS

| | | |
|---|---|---|
| CN | 103905347 A | 7/2014 |
| CN | 104618299 A | 5/2015 |
| EP | 3151432 B1 | 8/2018 |

OTHER PUBLICATIONS

Ladaycia et al., "EM-Based Semi-Blind MIMO-OFDM Channel Estimation," 2018 IEEE International Conference on Acoustics, Speech and Signal Processing (ICASSP), IEEE, Apr. 15, 2018, pp. 3899-3903, XP033401662. No copy provided, per MPEP 609. Copy submitted in parent U.S. Appl. No. 17/295,270.

Nayebi et al., "Semi-Blind Channel Estimation in Massive MIMO Systems With Different Priors on Data Sysbols," 2018 IEEE International Conference on Acoustics, Speech and Signal Processing (ICASSP), IEEE, Apr. 15, 2018, pp. 3879-3883, XP033403965. No copy provided, per MPEP 609. Copy submitted in parent U.S. Appl. No. 17/295,270.

International Search Report and Written Opinion dated May 22, 2019 corresponding to International Patent Application No. PCT/CN2018/116576. No copy provided, per MPEP 609. Copy submitted in parent application serial No. 17/295,270.

First Office Action issued in corresponding Chinese Patent Application No. 201880100638.9, dated Oct. 13, 2022, with English summary thereof.

* cited by examiner

ANCHOR PROCESS OF DATA SYMBOLS IN CHANNEL ESTIMATION

CROSS REFERENCE TO RELATED APPLICATION

This is a Continuation of U.S. patent application Ser. No. 17/295,270 filed May 19, 2021 which is a 371 of International Patent Application No. PCT/CN2018/116576 filed Nov. 21, 2018. The contents of these applications are hereby incorporated by reference.

FIELD

Embodiments of the present disclosure generally relate to the field of communications, and in particular, to a device, method, apparatus and computer readable storage medium for channel estimation in a multiple input multiple output (MIMO) system.

BACKGROUND

Channel state information (CSI) is an important factor to achieve expected high capacity gains in multiple input multiple output (MIMO) systems. In practical systems, CSI may be determined by the channel estimation. For example, conventionally, channel coefficients may be estimated using training symbols or pilot symbols. As the number of user equipment (UEs) in massive MIMO (mMIMO) systems increases, the length of the pilot sequences required to accurately estimate the channel increases, which results in lower spectral efficiency.

In the fifth generation (5G) system, massive MIMO (mMIMO) is one of the key technologies. In mMIMO systems, enhanced mobile broadband (eMBB) and ultra-reliable low latency communication (URLLC) use cases will require an extreme data rate, ultra-high reliability, ultra-low latency and extreme user mobility, which causes the accuracy of the channel estimation to be become more important.

SUMMARY

In general, example embodiments of the present disclosure provide a device, method, apparatus and computer readable storage medium for channel estimation in a multiple input multiple output (MIMO) system.

In a first aspect, a device for channel estimation is provided in a MIMO system. The MIMO system comprises a receiver configured with a plurality of receiving antennas and a transmitter configured with a plurality of transmitting antennas. The device comprises at least one processor and at least one memory including computer program code. The at least one memory and the computer program code are configured to, with the at least one processor, cause the device to detect, from a plurality of signals received by the plurality of receiving antennas from the plurality of transmitting antennas, a plurality of data symbols based on channel estimation. The device is also caused to adjust the plurality of detected data symbols based on a set of constellation points for a modulation mode used by the transmitter and associated with the plurality of signals. The device is further caused to update the channel estimation based on the plurality of adjusted data symbols.

In a second aspect, a method of channel estimation is provided in a MIMO system. The MIMO system comprises a receiver configured with a plurality of receiving antennas and a transmitter configured with a plurality of transmitting antennas. In the method, a plurality of data symbols are detected based on channel estimation from a plurality of signals received by the plurality of receiving antennas from the plurality of transmitting antennas. The plurality of detected data symbols are adjusted based on a set of constellation points for a modulation mode used by the transmitter and associated with the plurality of signals. The channel estimation is updated based on the plurality of adjusted data symbols.

In a third aspect, there is provided an apparatus comprising means for performing the method according to the second aspect.

In a fourth aspect, there is provided a computer readable storage medium that stores a computer program thereon. The computer program, when executed by a processor of a device, causes the device to perform the method according to the second aspect.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, where:

FIGS. 3($a$)-3($f$) illustrate graphs of the performance comparisons of the EAM and EM processes in different testing cases in accordance with some example embodiments of the present disclosure;

Throughout the drawings, the same or similar reference numerals represent the same or similar element.

DETAILED DESCRIPTION

Principle of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "transmitter" refers to a device capable of transmitting a signal. As used herein, the term "receiver" refers to a device capable of receiving a signal. The transmitter or receiver may be implemented by or as a part of any suitable device, including, for example, a network device or a terminal device.

As used herein, the term "network device" refers to any suitable device at a network side of a communication network. The network device may include any suitable device in an access network of the communication network, for example, including a base station (BS), a relay, an access point (AP), a node B (NodeB or NB), an evolved NodeB (eNodeB or eNB), a gigabit NodeB (gNB), a Remote Radio Module (RRU), a radio header (RH), a remote radio head (RRH), a low power node such as a femto, a pico, and the like.

As used herein, the term "terminal device" refers to a device capable of, configured for, arranged for, and/or operable for communications with a network device or a further terminal device in a communication network. The communications may involve transmitting and/or receiving wireless signals using electromagnetic signals, radio waves, infrared signals, and/or other types of signals suitable for conveying information over air. In some embodiments, the terminal device may be configured to transmit and/or receive information without direct human interaction. For example, the terminal device may transmit information to the network device on predetermined schedules, when triggered by an internal or external event, or in response to requests from the network side.

Examples of the terminal device include, but are not limited to, user equipment (UE) such as smart phones, wireless-enabled tablet computers, laptop-embedded equipment (LEE), laptop-mounted equipment (LME), and/or wireless customer-premises equipment (CPE). For the purpose of discussion, some embodiments will be described with reference to UEs as examples of the terminal devices, and the terms "terminal device" and "user equipment" (UE) may be used interchangeably in the context of the present disclosure.

As used herein, the term "circuitry" may refer to one or more or all of the following:
a) hardware-only circuit implementations (such as implementations in only analog and/or digital circuitry) and
b) combinations of hardware circuits and software, such as (as applicable): (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and
c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the singular forms "a", "an", and "the" are intended to include the plural forms as well, unless the context clearly indicates otherwise. The term "includes" and its variants are to be read as open terms that mean "includes, but is not limited to". The term "based on" is to be read as "based at least in part on". The term "one embodiment" and "an embodiment" are to be read as "at least one embodiment". The term "another embodiment" is to be read as "at least one other embodiment". Other definitions, explicit and implicit, may be included below.

As used herein, the terms "first", "second" and the like may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

As described above, in the mMIMO systems, the accuracy of the channel estimation becomes more important. A very long pilot sequence may be required to improve the quality of channel estimates such as estimates of the channel coefficients. Semi-blind channel estimation may be used to improve the accuracy of the channel estimation while achieving the spectral high efficiency, thereby to allow 5G critical use cases. In the semi-blind channel estimation, in addition to the pilot symbols, unknown data symbols may also be used. As such, the number of required pilot symbols may be reduced while the accuracy can still be higher. As a result, the accuracy of the channel estimation and the length of the pilot sequence can be balanced.

An example process of the semi-blind channel estimation will be discussed below. In the MIMO or mMIMO systems, the channel estimation may be described in general using the equation (1) as follows:

$$y=Hx+z \quad (1)$$

where:
y represents received symbols on each receive antenna, which is a complex matrix with a size (Nr, Num) where Nr represents the number of receive antennas and Num represents the number of received signals (or the number of transmitted symbols) in a time domain.

H represents a channel estimation matrix, which is a complex matrix with a size (Nr, Nt) where Nt represents the number of transmit antennas.

x represents the transmitted symbols on each transmit antenna, which is a complex matrix with a size (Nt, Num).

z represents received noise on each receive antenna, which is a complex vector with a size (Nr, Num).

In the semi-blind channel estimation, Num=pNum+dNum, where pNum represents the number of pilot symbols which are known by a receiver, and dNum represents the number of data symbols which are unknown by the receiver. It is supposed that $y=(y_p\ y_d)$ and $x=(x_p\ x_d)$, the equation (1) can be rewritten as:

$$(y_p y_d)=H(x_p x_d)+z \quad (2)$$

Accordingly, the channel estimation matrix H is estimated by using known y and $x_p$. Compared with the pure pilot-based estimation, a major concern is that unknown $x_d$ needs be estimated to achieve a relatively accurate channel estimation matrix and reduce the required pilot symbol length.

Conventionally, an expectation Maximize (EM) process may be used for the semi-blind channel estimation in the mMIMO systems. The EM process is an iteration process where each iteration involves two steps, respectively referred to as Step E and Step M. In Step E, the expectation of the data symbols is calculated. In Step M, the estimated values of the data symbols are used to update the channel estimation matrix.

An example EM process will be discussed below.

Input:
y: received signals, which has a size (Nr, Num), including (Nr, pNum) pilot signals and (Nr, dNum) data signals.
x: transmitted pilot and data symbols, which has a size (Nt, Num), including (Nt, pNum) pilot symbols and (Nt, dNum) data symbols.
$\sigma^2$: noise power where the pilot and data symbols are normalized as a discrete gaussian random variable, N(0,1).

Output:
H: the estimated channel estimation matrix, which has a size (Nr, Nt).

Initialization:
ite: the iteration number, for example, ite=4.
H: the channel estimation matrix H is initialized by the minimum mean square error (MMSE) algorithm based on pilot symbol information.

EM Process Main Routine:
For i=0 to ite:
Step E: calculate the expectation $u_d$ and covariance values $\Sigma$ of the data symbols using the following equations (3) and (4):

$$u_d = (H^H H + \sigma^2 I)^{-1} H^H y_d \quad (3)$$

$$\Sigma = \sigma^2 (H^H H + \sigma^2 I)^{-1} \quad (4)$$

Step M: calculate the channel estimation matrix using the equation (5):

$$H = (y_p x_p^H + y_d u_d^H)(x_p x_p^H + u_d u_d^H + dNum*\Sigma)^{-1} \quad (5)$$

Output: H
End of EM Algorithm Main Routine

In the above equations (3), H represents the channel estimation matrix derived in the last iteration, and I represents a diagonal unit matrix.

The EM process involves only a frequency-domain process of the channel estimation. However, the accuracy of the channel estimation is not good enough for the mMIMO systems. Specially in the case of using high order modulation such as 16 Quadrature Amplitude Modulation (16-QAM) and 64-QAM, a gain achieved by the EM-based channel estimation is smaller compared with the MMSE algorithm based on only the pilot symbols.

In addition, the EM process is a closed form based solution, and this process is based on the assumption that a data symbol is a continuous Gaussian random variable. In reality, however, a data symbol can only be assigned to one of several discrete modulation values. This inappropriate assumption induces unavoidable estimation errors in the EM process. Moreover, the EM process will become very complex under considering a data symbol as a discrete value.

Embodiments of the present disclosure provide an anchor process of data symbols in the semi-blinding channel estimation. This anchor process is a post process for detected symbols. With this process, in a MIMO or Multi-User MIMO (MU-MIMO) system, a receiver configured with a plurality of receiving antennas receives signals from one or more transmitters each configured with a plurality of transmitting antennas, and then a plurality of data symbols are detected from these signals based on channel estimation. The data symbols are adjusted based on a set of constellation points for a modulation mode or scheme. The modulation mode or scheme is used at the transmitter and associated with the received signals. For example, if a detected data symbol is already close enough with one constellation value associated with the modulation mode, this constellation value may be assigned to that detected data symbol. Accordingly, the channel estimation can be updated based on the adjusted data symbols.

This anchor scheme allows a data symbol with a discrete value to be used in the semi-blinding channel estimation, but not limited to a Gaussian random variable as used by the convention EM process. Based on the adjusted data symbol, the accuracy of the channel estimation may be improved.

Figure 1:
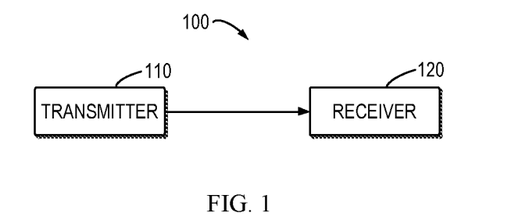
FIG. 1 illustrates an example environment in which embodiments of the present disclosure can be implemented.

FIG. 1 shows an example environment 100 in which embodiments of the present disclosure can be implemented. The environment 100, which is a part of a MIMO or mMIMO system, includes a transmitter 110 and a receiver 120. It is to be understood that one transmitter and one receiver are shown only for the purpose of illustration without suggesting any limitation to the scope of the present disclosure. The environment 100 may include any suitable number of transmitters and receivers adapted for implementing embodiments of the present disclosure.

The transmitter 110 and the receiver 120 can be implemented by or as a part of any suitable device. In some embodiments, the transmitter 110 may be implemented at a network device, and the receiver 120 may be implemented at a terminal device. In the embodiments where the environment 100 is a part of a relay communication network. In this example, the transmitter 110 may be implemented at a network device, and the receiver 120 may be at a relay, and vice versa. In some other embodiments, the transmitter 110 and the receiver 120 may be both implemented at terminal devices in device-to-device (D2D) communications, which may be alternatively referred to as sidelink, or vehicle to everything (V2X).

The communication between the transmitter 110 an the receiver 120 may follow any suitable communication standards or protocols such as Universal Mobile Telecommunications System (UMTS), long term evolution (LTE), LTE-Advanced (LTE-A), the fifth generation (5G) NR, Wireless Fidelity (Wi-Fi) and Worldwide Interoperability for Microwave Access (WiMAX) standards, and employs any suitable communication technologies, including, for example, Multiple-Input Multiple-Output (MIMO), Orthogonal Frequency Division Multiplexing (OFDM), time division multiplexing (TDM), frequency division multiplexing (FDM), code division multiplexing (CDM), Bluetooth, ZigBee, and machine type communication (MTC), enhanced mobile broadband (eMBB), massive machine type communication (mMTC) and ultra-reliable low latency communication (uRLLC) technologies. In some embodiments, the MIMO technology, such as single-user MIMO (SU-MIMO) and multi-user MIMO (MU-MIMO) technologies, may be used for the communications in the environment 100.

The transmitter 110 is provided with a plurality of transmitting antennas. The receiver 120 is provided with a plurality of receiving antennas. The receiver 120 can perform the channel estimation based on signals received by the plurality of receiving antennas from one or more transmitters each configured with a plurality of transmitting antennas. In various example embodiments of the present disclosures, a plurality of data symbols are detected by the receiver 120 from the received signals based on channel estimation. For one of the detected data symbols, the receiver 120 adjusts the detected data symbol based on a set of constellation points for a modulation mode that is used at the transmitter 110 and associated with the received signals. Then, the channel estimation is updated based on the adjusted data symbols.

Figure 2:
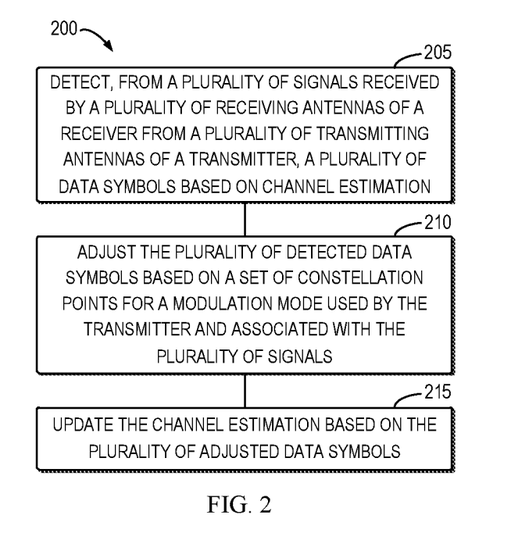
FIG. 2 illustrates a flowchart of an example method in accordance with some example embodiments of the present disclosure.

FIG. 2 shows a flowchart of an example method 200 in accordance with some embodiments of the present disclosure. The method 200 can be implemented at the receiver 120 as shown in FIG. 1. For the purpose of discussion, the method 200 will be described with reference to FIG. 1.

At block 205, the receiver 120 detects, from a plurality of signals received by the plurality of receiving antennas from the plurality of transmitting antennas of the transmitter 110, a plurality of data symbols based on channel estimation. The channel estimation may be current channel estimation obtained using any suitable approach. This detection can utilize any suitable approach of detecting data symbols that already exists or will be developed in the future. The scope of the present disclosure will not be limited in this regard. As an example, the transmitter 110 may transmit the plurality of data symbols with the plurality of transmitting antennas at the same. Accordingly, the receiver 120 may use the MMSE algorithm or other algorithms to detect these data symbols.

At block 210, the receiver 120 adjusts the detected data symbols based on a set of constellation points for a modulation mode that is used by the transmitter 110 and associated with the received signals. In some embodiments, the data symbol may be implemented by an OFDM symbol. The receiver 120 may be aware of the modulation mode by an explicit or implicit indication transmitted by the transmitted 110. For example, the transmitter 110 may inform the receiver 120 of the modulation mode that is used for the transmitted signals. The modulation mode may also be defined in advance and known to both the transmitter 110 and the receiver 120.

In some example embodiments, the receiver 120 may adjust the data symbols one by one. For example, in the case where Quadrature Phase Shift Keying (QPSK) modulation is used by the transmitter 110 for the modulation, each constellation point may be represented by a complex value with a real part and an imaginary part, both selected from a value set $\{-1,1\}$. Each of the detected data symbols may be adjusted based on at least one comparison with a constellation point in the set of constellation points.

In some example embodiments, the detected data symbol may be adjusted based on a nearer constellation point of the modulation mode. For example, if when the detected data symbol is mapped onto the constellation of the modulation mode, the detected data symbol is very close to a constellation point, the detected data symbol may be adjusted to correspond to the constellation point.

In some example embodiments, both the detected data symbol and the constellation point may comprise real and imaginary parts. In the context of the present disclosure, a symbol assigned to a real value may be considered to have an imaginary part that is zero. For the purpose of discussion, the real part of the constellation point will be referred to as a reference real part, and the imaginary part of the constellation point will be referred to as a reference imaginary part.

The data symbol may be adjusted based on at least one of a distance (referred to as a first distance) between the real part of the modulated data symbol and the reference real part of the constellation point and a distance (referred to as a second distance) between the imaginary part of the modulated data symbol and the reference imaginary part of the constellation point. In some example embodiments, the detected data symbol may be adjusted based on comparison of the first and/or second distances with a threshold distance. For example, if it is determined that the first or second distance is below the threshold distance, the real or imaginary part of the detected data symbol may be adjusted to be the reference real or imaginary part.

In some example embodiments, the detected data symbol may be adjusted to be limited within a predetermined range. For example, the value of detected data symbol may be limited to the maximum value (or a larger value) and the minimum value (or a smaller value) of the set of constellation points.

In some example embodiment, if the reference real part of the constellation point has a value (referred to as a first reference value) greater than a threshold value, it is determined whether a value (referred to as a first value) of the real part of the detected data symbol is greater than the first reference value. If so, the first value may be adjusted to be the first reference value. If the reference imaginary part of the constellation point has a value (referred to as a second reference value) greater than the threshold value, it is determined whether a value (referred to as a second value) of the imaginary part of the detected data symbol is greater than the second reference value. If so, the second value may be adjusted to be the second reference value.

In some example embodiment, if the first reference value of the reference real part of the constellation point is below than a threshold value, it is determined whether the first value of the real part of the detected data symbol is below the first reference value. If so, the first value may be adjusted to be the first reference value. If the second reference value of the reference imaginary part of the constellation point is below the threshold value, it is determined whether the second value of the imaginary part of the detected data symbol is below the second reference value. If so, the second value may be adjusted to be the second reference value.

It is to be understood that the threshold values for selecting a larger value of real or imaginary parts of the set of constellation points and a smaller value of real or imaginary parts of the set of constellation points may be determined according to actual needs.

Based on the plurality of adjusted data symbols, the receiver 120 updates the channel estimation at block 215. The channel estimation may be implemented in any suitable approach that utilizes the data symbols. For example, the semi-blind channel estimation using the EM algorithm may be used.

In order to further improve the accuracy of the channel estimation, in some example embodiments, the detection of the data symbols at block 205, the adjustment of the data symbols at block 210 and the updating of the channel estimation at block 215 may be performed iteratively. For the first time in the iterative operations, the data symbol may be detected using channel estimation initialized in any suitable way.

The anchor process according to embodiments of the present disclosure may be added into and thereby improve the conventional EM process as described above. An example EM process with an additional anchor process will be described below. In this example, the anchor process is performed in a complex space. The detected symbol may be represented as a complex value. Accordingly, the anchor process is applied onto the real and imaginary parts, separately.

A value set (referred to as "SMV") of the constellation points for a modulation mode may be defined as follows, for example:

For QPSK, SMV can be:

$$SMV=\{-1,1\} \qquad (6)$$

For 16QAM, SMV can be:

$$SMV=\{-3,-1,1,3\} \quad (7)$$

The transmitted data symbols may use different modulation modes. This means that different data symbols may have different SMVs. This example anchor process is illustrated as below.

Input:
  $x_d$: the detected data symbols, which has a size (Nt, dNum).
  SMV: the value set for the constellation points.
Output:
  $x_d$: the adjusted data symbols, which has a size (Nt, dNum).
Initialization:
  anRate: an anchor rate, for example, anRate=0.25.
  stepvalue: calculate stepvalue for SMV, which is the nearest distance between neighboring constellation points. For example, in the above equations (6) and (7), stepvalue=2.
Anchor Process Main Routine:
  For each x in $x_d$:
  If real(x) is bigger or less than the maximum or minimum value in SMV, then real(x) is set as the maximum or minimum value in SMV, where real(x) represents a value of a real part of x.
  If imag(x) is bigger or less than the maximum or minimum value in SMV, then imag(x) is set as the maximum or minimum value in SMV where imag(x) represents a value of an imaginary part of x.
  For each x in $x_d$:
  Find the nearest value in SMV for x:

$$realV = \operatorname*{argmin}_{v \in SMV} |v - real(x)| \quad (8)$$

$$imagV = \operatorname*{argmin}_{v \in SMV} |v - imag(x)| \quad (9)$$

If $|realV - real(x)| < anRate * stepValue$, set:real(x) = realV.

If $|imagV - imag(x)| < anRate * stepValue$, set:imag(x) = imagV.

Output: the adjusted $x_d$
End of Anchor Process Main Routine

In this example anchor process, anRate is assigned to 0.25 only for the purpose of illustration. Other values of anRate are also possible.

The EM process with the additional anchor process is referred to as an EAM process herein. The example EAM algorithm main routine is illustrated as follows: For i=0 to ite:
  Step E: the expectation and covariance of the data symbols based on the equations (3) and (4).
  Step A: apply the anchor process on the detected data symbols.
  Step M: calculate the channel estimation based on the equation (5).

The anchor process can improve the performance of the channel estimation compared with the EM process. FIGS. 3(a)-3(f) illustrate graphs of the performance comparisons of the EAM and EM processes in different testing cases in accordance with some example embodiments of the present disclosure.

These testing cases are based on the following normalization:
  The real value based simulation is used for BPSK modulation cases. For complex modulation cases, the adjustment of the data symbol is decoupled as the adjustment of the real part and the adjustment of the imaginary part. The size of the real value based channel estimation matrix is (2Nr, 2Nt). The size of the transmitted data symbol matrix is (2Nt, Num).
  The channel estimation matrix H is generated by normal distribution N(0,1), normalized by $\sigma^2=1/\operatorname{sqrt}(Nt)$ for the BPSK modulation cases or $\sigma^2=1/\operatorname{sqrt}(2Nt)$ for the complex modulation cases.
  The transmitted symbol x is uniformly randomly selected from SMV, the elements in SMV is normalized as N(0,1) discrete gaussian variables.
  Noise is generated by normal distribution N(0,1), and normalized by $\sigma^2=1/SNR$.
  For each case, 10000 sample data is simulated.
  The channel estimation matrix is firstly initialized by the MMSE algorithm based on pilot information.
  For the BPSK modulation cases, total 4 iterations are used, and the channel estimation matrix results of 2 and 4 iterations are compared
  For 16QAM modulation cases, total 8 iterations are used, and the channel estimation matrix results of 4 and 8 iterations are compared.
  In the pilot symbol simulation, the matrix organized by all pilot symbols for all users (which has a size pNum*Nt) is a full rank matrix.
  The pilot symbols may be any suitable sequence that is known at both the transmitter 110 and the receiver 120. For example, demodulation reference signals (DMRSs) may be used.

Figure 3A:
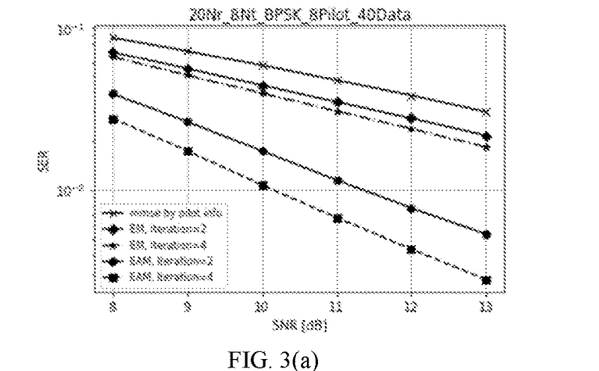
Figure 3B:
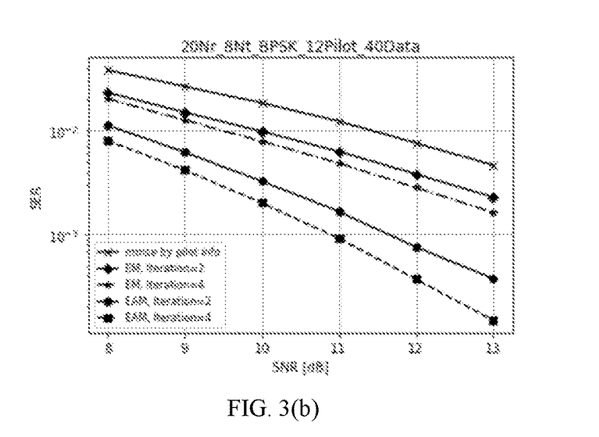
Figure 3C:
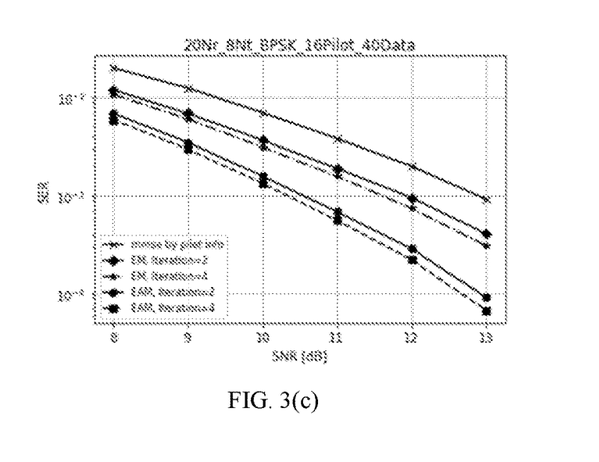
Figure 3D:
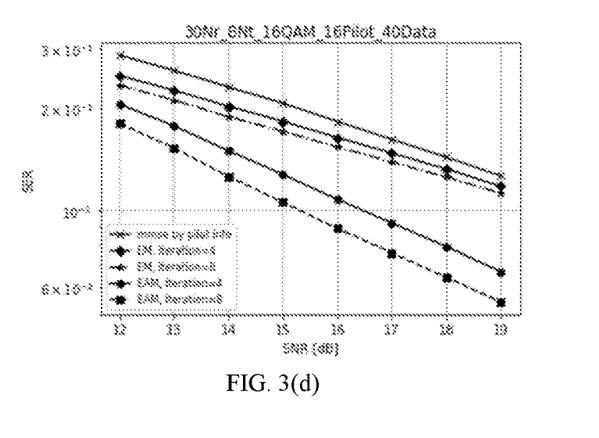
Figure 3E:
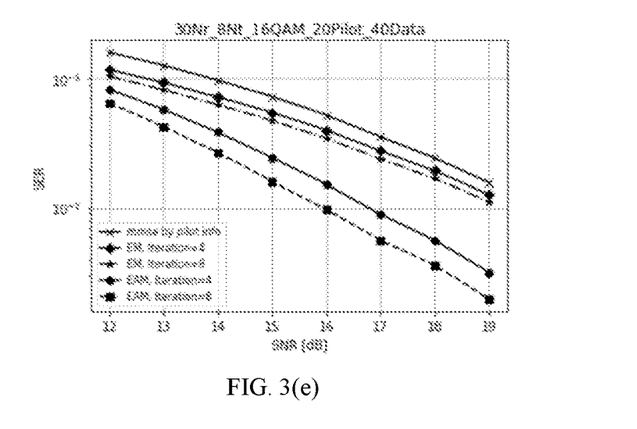
Figure 3F:
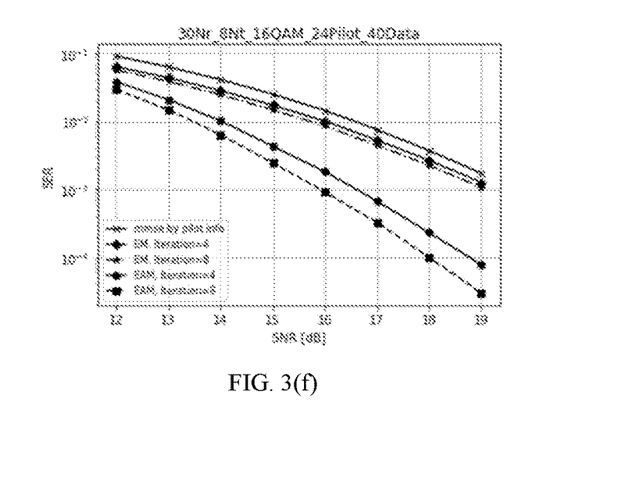

FIG. 3(a) shows a graph in Case 1 where Nr=20, Nt=8, Modulation=BPSK, Num=48 (pNum=8, dNum=40). FIG. 3(b) shows a graph in Case 2 where Nr=20, Nt=8, Modulation=BPSK, Num=52 (pNum=12, dNum=40). FIG. 3(c) shows a graph in Case 3 where Nr=20, Nt=8, Modulation=BPSK, Num=56 (pNum=16, dNum=40). FIG. 3(d) shows a graph in Case 4 where Nr=30, Nt=8, Modulation=16QAM, Num=56 (pNum=16, dNum=40). FIG. 3(e) shows a graph in Case 5 where Nr=30, Nt=8, Modulation=16QAM, Num=60 (pNum=20, dNum=40). FIG. 3(f) shows a graph in Case 6 where Nr=30, Nt=8, Modulation=16QAM, Num=60 (pNum=24, dNum=40).

Table 1 shows MIMO detection gains of the EM and EAM processes compared with the MMSE algorithm.

TABLE 1

| Case | EM gain | EAM gain |
|------|---------|----------|
| 1 | ~1.5 dB | >5 dB |
| 2 | ~1.5 dB | >4 dB |
| 3 | ~1 dB | ~3 dB |
| 4 | ~1 dB | ~5 dB |
| 5 | <1 dB | ~4 dB |
| 6 | <1 dB | >3 dB |

As shown, the EAM process has far more better detection accuracy compared with the EM process. In the higher order modulation cases, for example for 16QAM cases, the EM process cannot get much gain compared with the MMSE algorithm, but the EAM process can achieve higher gain compared with the MMSE algorithm. In addition, compared with the EM process, the EAM process can achieve more extra gain by running more iterations. However, the anchor process will not cause much computing resources, which means the EAM process has equivalent level of computing complexity as the EM process.

Figure 4:
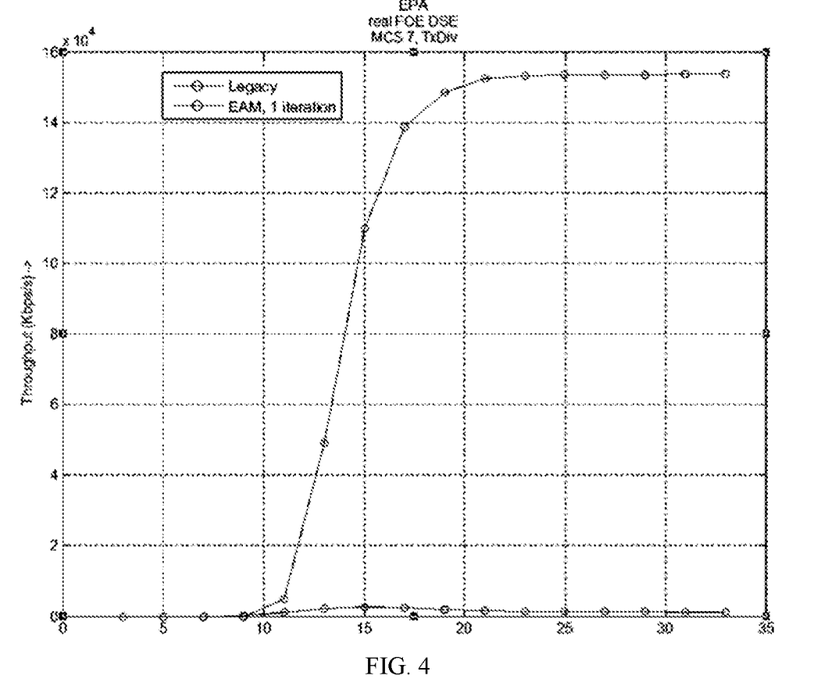
FIG. 4 illustrates the performance of a 5Gmax implementation of the EAM process simplified to meet product requirements according to some example embodiments of the present disclosure.

FIG. 4 shows the performance of a 5Gmax implementation of the EAM process simplified to meet product requirements. In this implementation, verizone 28 Ghz (cmWave), an Extended Pedestrian A (EPA) channel with 50 km/h is used, and only 1 iteration is performed.

If it is extend to more realistic channels and modulation and coding schemes (MCSs) and ranks, the overall summary of the performance of the product simplified EAM by a 5Gmax simulator is listed in Table 2:

TABLE 2

| Max possible MCS for | ref | | | EAM (1 iteration) | | | |
|---|---|---|---|---|---|---|---|
| 90 & TP | rank1 | rank2 | TxDiv | rank1 | rank2 | TxDiv | EAM VS ref |
| TDL150 | 5 | 0 | 4 | 10 | 0 | 9 | No lose or gain for all MCS |
| SMI150 | 5 | 2 | 5 | 9 | 4 | 9 | No lose or gain for all MCS |
| EPA75 | 1 | 0 | 1 | 7 | 1 | 8 | No lose or gain for all MCS |
| EPA50 | 2 | 1 | 3 | 5 | 1 | 9 | No lose or gain for all MCS |

It can be seen that the EAM process may achieve significant gain in realistic moving channels in the product simulator.

In some embodiments, an apparatus capable of performing the method 200 may comprise means for performing the respective steps of the method 200. The means may be implemented in any suitable form. For example, the means may be implemented in a circuitry or software module.

In some example embodiments, the apparatus comprises: means for detecting, from a plurality of signals received by a plurality of receiving antennas of a receiver from a plurality of transmitting antennas of a transmitter, a plurality of data symbols based on channel estimation; means for adjusting the plurality of detected data symbols based on a set of constellation points for a modulation mode used by the transmitter and associated with the plurality of signals; and means for updating the channel estimation based on the plurality of adjusted data symbols.

In some example embodiments, the means for adjusting the plurality of detected data symbols may comprise means for adjusting, for a detected data symbol of the plurality of detected data symbol, the detected data symbol based on at least one comparison of the detected data symbol and a constellation point in the set of constellation points.

In some example embodiments, the detected data symbol may comprise a real part and an imaginary part, and the constellation point may comprise a reference real part and a reference imaginary part.

In some example embodiments, the means for adjusting the detected data symbol based on the at least one comparison may comprise: means for determining at least one of a first distance between the real part of the detected data symbol and the reference real part of the constellation point, and a second distance between the imaginary part of the detected data symbol and the reference imaginary part of the constellation point; and means for adjusting the detected data symbol based on the at least one comparison of the at least one of the first and second distances with a threshold distance.

In some example embodiments, the means for adjusting the detected data symbol based on the at least one comparison of the at least one of the first and second distances may comprise: means for in response to the first distance being determined, determining whether the first distance is below the threshold distance; and means for in response to determining that the first distance is below the threshold distance, adjusting the real part of the detected data symbol to be the reference real part of the constellation point.

In some example embodiments, the means for adjusting the detected data symbol based on the at least one comparison of the at least one of the first and second distances may comprise: means for in response to the second distance being determined, determining whether the second distance is below the threshold distance; and means for in response to determining that the second distance is below the threshold distance, adjusting the imaginary part of the detected data symbol to be the imaginary real part of the constellation point.

In some example embodiments, a first reference value of the reference real part of the constellation point may be greater than a threshold value. In these embodiments, the means for adjusting the detected data symbol based on the at least one comparison may comprise: means for determining whether a first value of the real part of the detected data symbol is greater than the first reference value; and means for in response to determining that the first value is greater than the first reference value, adjusting the first value to be the first reference value.

In some example embodiments, a second reference value of the reference imaginary part of the constellation point may be greater than a threshold value. In these embodiments, the means for adjusting the detected data symbol based on the at least one comparison may comprise: means for determining whether a second value of the imaginary part of the detected data symbol is greater than the second reference value; and means for in response to determining that the second value is greater than the second reference value, adjusting the second value of the imaginary part of the detected data symbol to be the second reference value.

In some example embodiments, a first reference value of the reference real part of the constellation point may be below a threshold value. In these embodiments, the means for adjusting the detected data symbol based on the at least one comparison may comprise: means for determining whether a first value of the real part of the detected data symbol is below the first reference value; and means for in response to determining that the first value is below the first reference value, adjusting the first value to be the first reference value.

In some example embodiments, a second reference value of the reference imaginary part of the constellation point may be below a threshold value. In these embodiments, the means for adjusting the detected data symbol based on the at least one comparison may comprise: means for determining whether a second value of the imaginary part of the detected data symbol is below the second reference value; and means for in response to determining that the second value is greater than the second reference value, adjusting the second value of the imaginary part of the detected data symbol to be the second reference value.

In some example embodiments, the detecting of the plurality of data symbols, the adjusting of the plurality of detected data symbols and the updating of the channel estimation may be performed iteratively.

In some example embodiments, the apparatus may further comprise means for receiving, at the receiver, an indication of the modulation mode from the transmitter.

Figure 5:
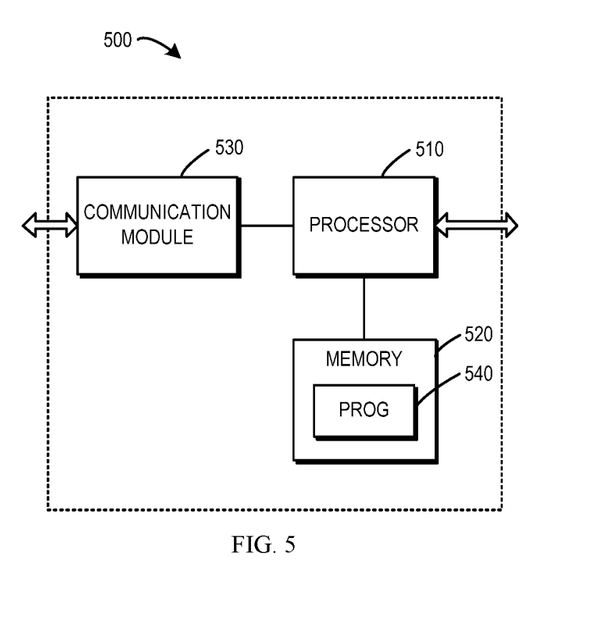
FIG. 5 illustrates a simplified block diagram of a device that is suitable for implementing embodiments of the present disclosure.

FIG. 5 is a simplified block diagram of a device 500 that is suitable for implementing embodiments of the present disclosure. The device 500 can be implemented at the receiver 120 as shown in FIG. 1.

As shown, the device 500 includes a processor 510, a memory 520 coupled to the processor 510, a communication module 530 coupled to the processor 510, and a communication interface (not shown) coupled to the communication module 530. The memory 520 stores at least a program 540. The communication module 530 is for bidirectional communications, for example, via multiple antennas. The communication interface may represent any interface that is necessary for communication.

The program 540 is assumed to include program instructions that, when executed by the associated processor 510, enable the device 500 to operate in accordance with the embodiments of the present disclosure, as discussed herein with reference to FIGS. 1, 2, 3(*a*)-3(*f*) and 4. The embodiments herein may be implemented by computer software executable by the processor 510 of the device 500, or by hardware, or by a combination of software and hardware. The processor 510 may be configured to implement various embodiments of the present disclosure.

The memory 520 may be of any type suitable to the local technical network and may be implemented using any suitable data storage technology, such as a non-transitory computer readable storage medium, semiconductor based memory devices, magnetic memory devices and systems, optical memory devices and systems, fixed memory and removable memory, as non-limiting examples. While only one memory 520 is shown in the device 500, there may be several physically distinct memory modules in the device 500. The processor 510 may be of any type suitable to the local technical network, and may include one or more of general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

All operations and features as described above with reference to FIGS. 1, 2, 3(*a*)-3(*f*) and 4 are likewise applicable to the device 500 and have similar effects. For the purpose of simplification, the details will be omitted.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 200 as described above with reference to FIGS. 1, 2, 3(*a*)-3(*f*) and 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable media.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), Digital Versatile Disc (DVD), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

Various embodiments of the techniques have been described. In addition to or as an alternative to the above, the following examples are described. The features described in any of the following examples may be utilized with any of the other examples described herein.

What is claimed is:

1. A device for channel estimation in a multiple input multiple output system comprising a receiver configured with a plurality of receiving antennas and a transmitter configured with a plurality of transmitting antennas, the device comprising:
   at least one processor; and
   at least one memory including computer program code;
   the at least one memory and the computer program code configured to, with the at least one processor, cause the device to:
   detect, from a plurality of signals received by the plurality of receiving antennas from the plurality of transmitting antennas, a plurality of data symbols based on channel estimation;
   adjust a value of at least one part of each of the plurality of detected data symbols to be a value of a corresponding part of each of a set of constellation points for a modulation mode used by the transmitter and associated with the plurality of signals; and
   update the channel estimation based on the plurality of adjusted data symbols.

2. The device of claim 1, wherein the at least one memory and computer program code are further configured, with the at least one processor, to cause the device to adjust the plurality of detected data symbols by:
   for a detected data symbol of the plurality of detected data symbol, adjusting the detected data symbol based on at least one comparison of the detected data symbol and a constellation point in the set of constellation points.

3. The device of claim 2, wherein the detected data symbol comprises a real part and an imaginary part, and the constellation point comprises a reference real part and a reference imaginary part.

4. The device of claim 3, wherein the at least one memory and computer program code are further configured, with the at least one processor, to cause the device to adjust the detected data symbol based on the at least one comparison by:
   determining at least one of a first distance between the real part of the detected data symbol and the reference real part of the constellation point, and a second distance between the imaginary part of the detected data symbol and the reference imaginary part of the constellation point; and
   adjusting the detected data symbol based on the at least one comparison of the at least one of the first and second distances with a threshold distance, by
   in response to the first distance being determined, determining whether the first distance is below the threshold distance;
   in response to determining that the first distance is below the threshold distance, adjusting the real part of the detected data symbol to be the reference real part of the constellation point;
   in response to the second distance being determined, determining whether the second distance is below the threshold distance; and
   in response to determining that the second distance is below the threshold distance, adjusting the imaginary part of the detected data symbol to be the imaginary real part of the constellation point.

5. The device of claim 3, wherein a first reference value of the reference real part of the constellation point is greater than a threshold value, and wherein the at least one memory and computer program code are further configured, with the at least one processor, to cause the device to adjust the detected data symbol based on the at least one comparison by:
   determining whether a first value of the real part of the detected data symbol is greater than the first reference value; and
   in response to determining that the first value is greater than the first reference value, adjusting the first value to be the first reference value,
   wherein a second reference value of the reference imaginary part of the constellation point is greater than a threshold value, and the device is caused to adjust the detected data symbol based on the at least one comparison by:
   determining whether a second value of the imaginary part of the detected data symbol is greater than the second reference value; and
   in response to determining that the second value is greater than the second reference value, adjusting the second value of the imaginary part of the detected data symbol to be the second reference value.

6. The device of claim 3, wherein a first reference value of the reference real part of the constellation point is below a threshold value, and wherein the at least one memory and computer program code are further configured, with the at least one processor, to cause the device to adjust the detected data symbol based on the at least one comparison by:
   determining whether a first value of the real part of the detected data symbol is below the first reference value; and
   in response to determining that the first value is below the first reference value, adjusting the first value to be the first reference value,
   wherein a second reference value of the reference imaginary part of the constellation point is below a threshold value, and the device is caused to adjust the detected data symbol based on the at least one comparison by:
   determining whether a second value of the imaginary part of the detected data symbol is below the second reference value; and
   in response to determining that the second value is greater than the second reference value, adjusting the second value of the imaginary part of the detected data symbol to be the second reference value.

7. The device of claim 1, wherein the device is caused to detect the plurality of data symbols, adjust the plurality of detected data symbols and update the channel estimation, iteratively.

8. The device of claim 1, wherein the at least one memory and computer program code are further configured, with the at least one processor, to cause the device to:
   receive, at the receiver, an indication of the modulation mode from the transmitter.

9. A method of channel estimation in a multiple input multiple output system comprising a receiver configured with a plurality of receiving antennas and a transmitter configured with a plurality of transmitting antennas, the method comprising:
   detecting, from a plurality of signals received by the plurality of receiving antennas from the plurality of transmitting antennas, a plurality of data symbols based on channel estimation;

adjusting a value of at least one part of each of the plurality of detected data symbols to be a value of a corresponding part of each of a set of constellation points for a modulation mode used by the transmitter and associated with the plurality of signals; and updating the channel estimation based on the plurality of adjusted data symbols.

10. The method of claim 9, wherein adjusting the plurality of detected data symbol comprises:

for a detected data symbol of the plurality of detected data symbols, adjusting the detected data symbol based on at least one comparison of the detected data symbol and a constellation point in the set of constellation points.

11. The method of claim 10, wherein the detected data symbol comprises a real part and an imaginary part, and the constellation point comprises a reference real part and a reference imaginary part.

12. The method of claim 11, wherein adjusting the detected data symbol based on the at least one comparison comprises:

determining at least one of a first distance between the real part of the detected data symbol and the reference real part of the constellation point, and a second distance between the imaginary part of the detected data symbol and the reference imaginary part of the constellation point; and adjusting the detected data symbol based on the at least one comparison of the at least one of the first and second distances with a threshold distance, wherein the adjusting the detected data symbol based on the at least one comparison of the at least one of the first and second distances comprises:

in response to the first distance being determined, determining whether the first distance is below the threshold distance;

in response to determining that the first distance is below the threshold distance, adjusting the real part of the detected data symbol to be the reference real part of the constellation point;

in response to the second distance being determined, determining whether the second distance is below the threshold distance; and in response to determining that the second distance is below the threshold distance, adjusting the imaginary part of the detected data symbol to be the imaginary real part of the constellation point.

13. The method of claim 11, wherein a first reference value of the reference real part of the constellation point is greater than a threshold value, and adjusting the detected data symbol based on the at least one comparison comprises:

determining whether a first value of the real part of the detected data symbol is greater than the first reference value; and in response to determining that the first value is greater than the first reference value, adjusting the first value to be the first reference value, wherein a second reference value of the reference imaginary part of the constellation point is greater than a threshold value, and adjusting the detected data symbol based on the at least one comparison comprises:

determining whether a second value of the imaginary part of the detected data symbol is greater than the second reference value; and in response to determining that the second value is greater than the second reference value, adjusting the second value of the imaginary part of the detected data symbol to be the second reference value.

14. The method of claim 11, wherein a first reference value of the reference real part of the constellation point is below a threshold value, and adjusting the detected data symbol based on the at least one comparison comprises:

determining whether a first value of the real part of the detected data symbol is below the first reference value; and in response to determining that the first value is below the first reference value, adjusting the first value to be the first reference value, wherein a second reference value of the reference imaginary part of the constellation point is below a threshold value, and adjusting the detected data symbol based on the at least one comparison comprises:

determining whether a second value of the imaginary part of the detected data symbol is below the second reference value; and in response to determining that the second value is greater than the second reference value, adjusting the second value of the imaginary part of the detected data symbol to be the second reference value.

15. The method of claim 9, wherein the detecting of the plurality of data symbols, the adjusting of the plurality of detected data symbols and the updating of the channel estimation are performed iteratively.

16. The method of claim 9, further comprising:

receiving, at the receiver, an indication of the modulation mode from the transmitter.

17. A non-transitory computer readable storage medium comprising program instructions stored thereon, the instructions, when executed by a processor of a device, causing the device to perform the method of claim 9.

* * * * *